United States Patent [19]
Walton

[11] 3,742,347
[45] June 26, 1973

[54] SHAFT MOVEMENT/DIFFERENTIAL PRESSURE MEASURING APPARATUS EMBODYING CAPACITIVE TRANSDUCERS

[75] Inventor: Hyman Walton, Seascale, England

[73] Assignee: United Kingdom Atomic Energy Authority, London, England

[22] Filed: Aug. 25, 1971

[21] Appl. No.: 174,874

Related U.S. Application Data

[63] Continuation-in-part of Ser. No. 135,224, April 19, 1971.

[52] U.S. Cl.......... 324/61 R, 73/398 C, 324/DIG. 1
[51] Int. Cl............................................. G01r 27/26
[58] Field of Search................ 324/61 R, DIG. 1; 73/398 C

[56] References Cited
UNITED STATES PATENTS

| | | | |
|---|---|---|---|
| 3,611,126 | 10/1971 | Lucka | 324/61 R |
| 3,519,923 | 7/1970 | Martin | 324/61 R |
| 2,666,896 | 1/1954 | Harris | 324/61 R |
| 3,318,153 | 5/1967 | Lode | 324/61 R X |
| 3,522,528 | 8/1970 | Towner | 324/61 R |

FOREIGN PATENTS OR APPLICATIONS 1,091,346   10/1960   Germany.......................... 324/61 R Primary Examiner—Stanley T. Krawczewicz
Attorney—Larson, Taylor and Hinds

[57] ABSTRACT

Measuring apparatus including a capacitive transducer which comprises members between which a first capacitance increases and a second capacitance simultaneously decreases in accordance with the magnitude of the physical quantity being measured. The first and second capacitances are connected as two arms of a four-arm bridge having as each of the two other arms a charge amplifier. Means are provided for applying an AC carrier waveform to the junction of the first and second capacitances and for demodulating the differential output of the two charge amplifiers to give an output representative of the magnitude of the physical quantity.

6 Claims, 7 Drawing Figures

VIBRATION

AMPLIFIER OUTPUT VOLTS.

WALL CONTACT

DISPLACEMENT OF OBJECT 10 IN CMS.

CURVE - a. RATIO OF $\frac{d}{D}$ SMALL
b. RATIO OF $\frac{d}{D}$ OPTIMUM
c. RATIO OF $\frac{d}{D}$ LARGE

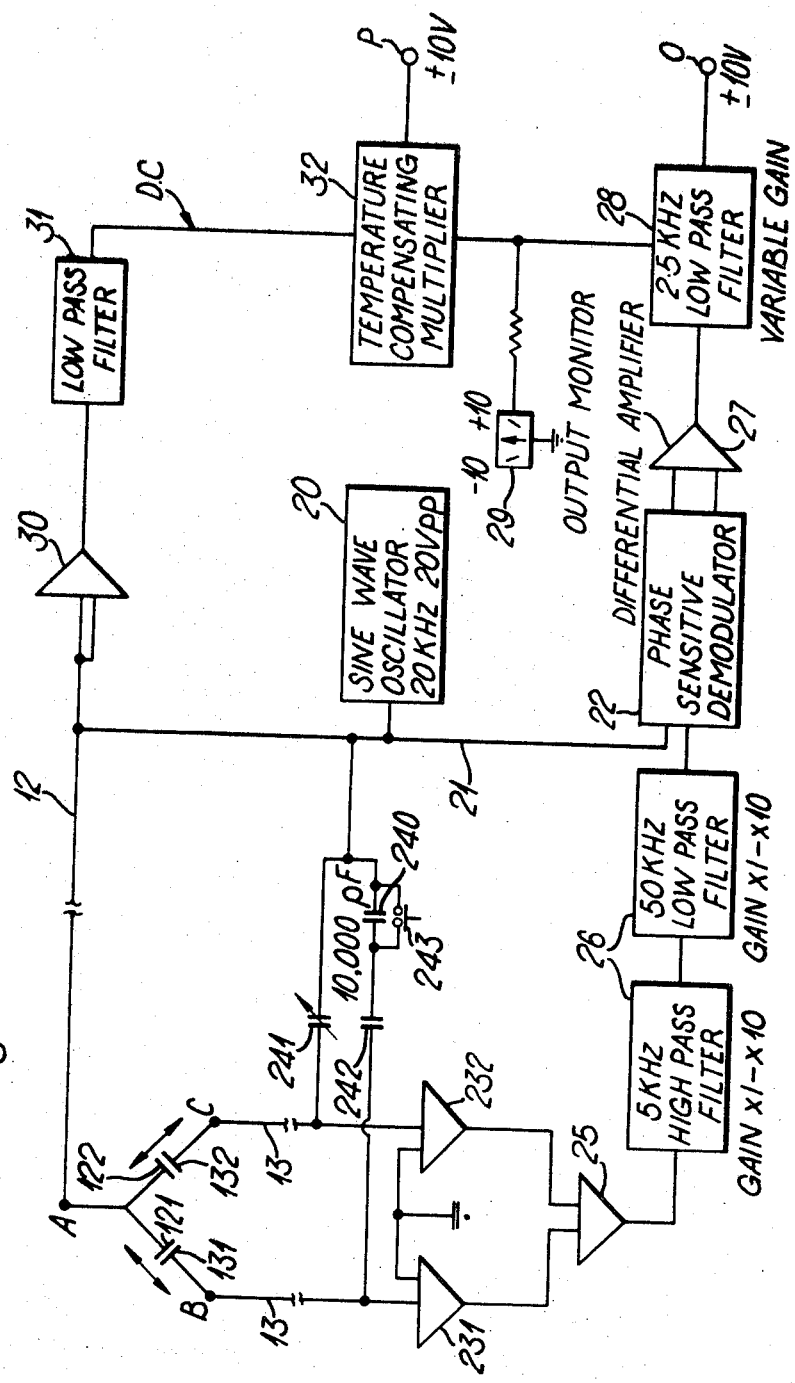

SHAFT MOVEMENT/DIFFERENTIAL PRESSURE MEASURING APPARATUS EMBODYING CAPACITIVE TRANSDUCERS

This is a continuation in part of my Application Ser. No. 135,224 filed Apr. 19, 1971.

BACKGROUND OF THE INVENTION

This invention relates to measuring apparatus embodying capacitive transducers. It can be used over a wide temperature range but has one important application in making remote measurements in environments at above 400°C.

By a capacitive transducer is meant a transducer in which the physical quantity to be measured, eg displacement, acceleration or pressure, varies the electrical capacitance between members in the transducer. Such changes in capacitance can be measured electrically, eg in a bridge circuit, as representative of changes in the physical quantity.

SUMMARY OF THE INVENTION

The invention provides measuring apparatus including a capacitive transducer which comprises members between which a first capacitance increases and a second capacitance simultaneously decreases in accordance with the magnitude of the physical quantity being measured, said first and second capacitances being connected as two arms of a four-arm bridge having as each of the two other arms a charge amplifier, means for applying an AC carrier waveform to the junction of said first and second capacitances, and means for demodulating the differential output of said two charge amplifiers to give an output representative of the magnitude of said physical quantity.

DESCRIPTION OF THE DRAWINGS

FIG. 3 is a circuit diagram.

DESCRIPTION OF THE PREFERRED EMBODIMENTS

Figures 1A, 1B, 2A:
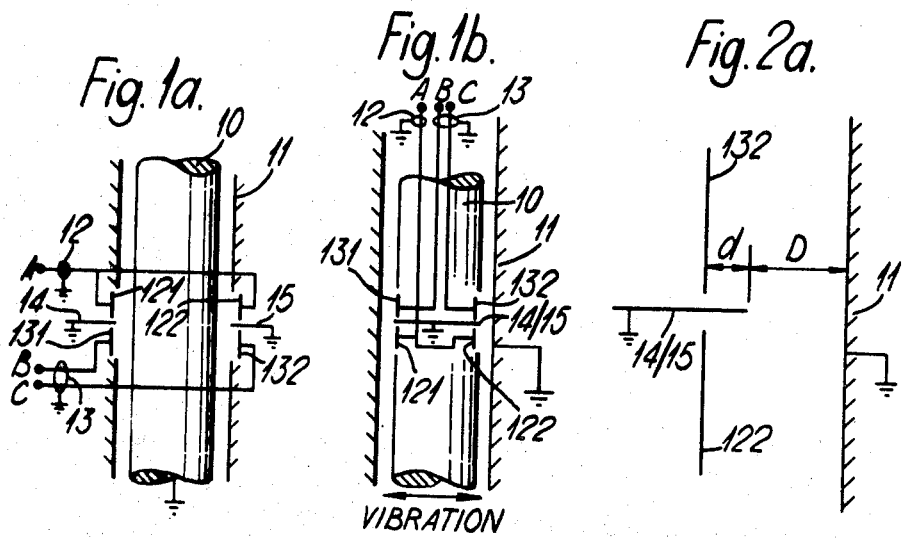
FIGS. 1a and 1b are diagrams illustrating the invention.
FIGS. 2a and 2b are a diagram and graph respectively indicating the performance of the invention.

In FIG. 1a an object 10 — which may be a shaft — is shown in a rigid body 11 — which may be a housing for the shaft. The body 11 has secured to it two diametrically opposed plates 121 and 122 having a common conductor in a mineral insulated cable 12. The body also has secured to it diametrically opposed acceptor plates 131 and 132 to which there is connected individually two conductors in a mineral insulated cable 13. Earth defining plates 14 and 15 exist between plates 121/131 and 122/132 respectively. The body 11 is earthed, as are the sheaths of the cables 12 and 13. Terminals A, B and C are marked (See also FIG. 3). Plates 121, 131 form one pair having a leakage capacitance between them and plates 122 and 132 form the other such pair. The value of the leakage capacitance depends on the width of the variable gap between object 10 and plates 14 or 15.

In FIG. 1b the same reference numerals are used as in FIG. 1a but the plates 121, 122, 131 and 132 are now carried by the object 10 — which may be a removable nuclear fuel element — instead of by the rigid body 11 — which may be the permanent structure of a nuclear reactor. The body 11 is earthed whereas, in FIG. 1a the object 10 was earthed.

Figure 2B:
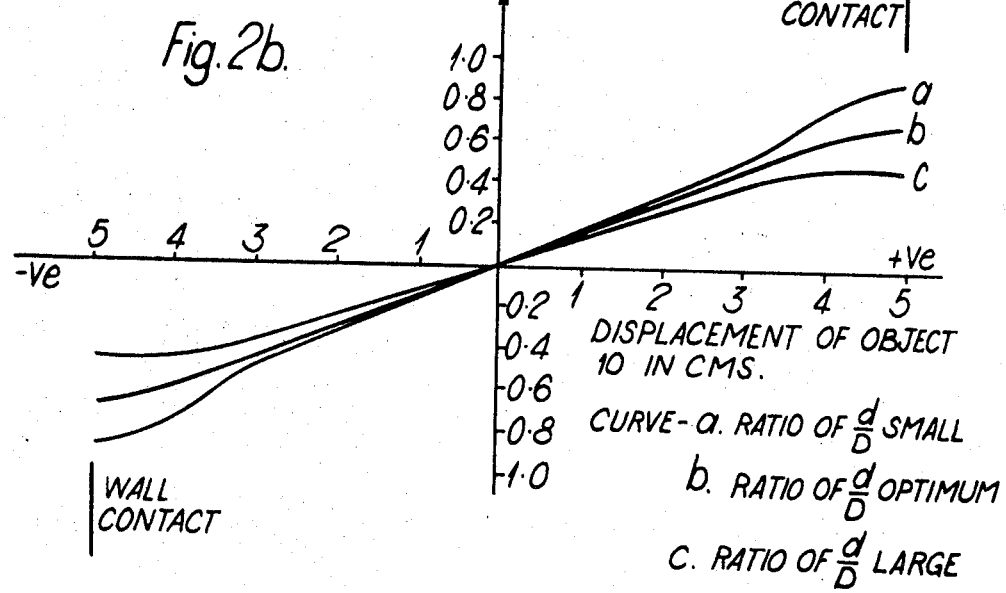

In FIGS. 2a and 2b, FIG. 2a being in effect an enlargement of a part of FIG. 1b, the performance of the invention is considered especially in relation to the position occupied by earth defining plate 14/15. In FIG. 2a the degree of projection of the earth plate 14/15 beyond the plates 122, 132 is indicated by the dimension $d$. The distance between the edge of plate 14/15 and the earthed body 11 is indicated by the dimension D. In FIG. 2b there are three curves $a$, $v$ and $c$ which show the performance of the invention of the various $d/D$ ratios indicated.

In FIG. 3 the cable 12 is connected to a 20 KHz oscillator 20, which provides a carrier waveform and also has an output connector 21 to a phase-sensitive demodulator 22. The capacitances 131, 132 can be considered as two arms of a bridge, the other two arms being charge amplifiers 231 and 232 connected to the capacitances 131, 132 by the cable 13. Capacitors 240, 241, 242 provide a calibration and balance circuit, a switch 243 acting as a calibration switch. (A "charge amplifier" is a high-gain D.C. amplifier with capacitative feedback which produces an output voltage directly proportional to the change of charge at its input terminals) Capacitor 241 is adjustable for zero setting. The output of the charge amplifiers is taken to a variable gain differential amplifier 25 and thence to a band-pass filter of 5 KHz band width centered on the oscillator frequency of 20 KHz. The output from the demodulator 22 is taken to another variable gain differential amplifier 27 and thence through a low-pass filter 28 which is set to pass signals up to 2.5 KHz. The output is monitored on a meter 29 which can be calibrated in units of displacement of the object 10. Alternatively the output could be recorded on magnetic tape, for subsequent analysis, associated with the output terminal O.

The cables 12, 13 may be long, one of the features of the invention, and this length is indicated by the break lines in the cables.

Preferably cable 12 is a thermocouple cable which monitors the temperature at the transducer represented by ABC in addition to serving its prime function of leading the 20 KHz drive signal to the transducer. The cable 12 is connected to a differential amplifier 30 the output of which is directly proportional to the transducer temperature. This output is passed to a low pas (5 Hz) filter 31 before being fed to a temperature compensating multiplier 32 also connected with the displacement output from filter 28. From terminal P of the multiplier 32 a temperature compensated signal appears.

In operation, the oscillator 20 feeds plates 121 and 122 with a 20 KHz carrier signal. These plates have leakage capacitances to the plates 131 and 132 respectively. These leakage capacitances are varied by any displacement of the object 10 because such displacement varies the widths of the gaps at the edges of plates 14 and 15. Thus the carrier waveforms fed to the conductors of cable 13 via these capacitances are modulated by the displacement of object 10. With diametrical disposition of plates 131 and 132 the overall mechanical and electrical symmetry, the modulated signals in the two conductors are in anti-phase. These signals receive amplification in amplifiers 231 and 232 and from these a differential signal is obtained from amplifier 25. The output from the filter 26 is demodulated and identified as positive or negative in the respective outputs of demodulator 22. The amplifier 27 provides a D.C. output.

A typical size for the plates 121:122:131 and 132 is 6.25 sq. cms to give a capacity of 0.05 pica-farade. The capacitor 242 is 10 pF and capacitor 241 ranges over 5 – 20 pF. Capacitor 240 is 10,000 pF.

For the operation of the temperature compensating circuit, the temperature signal derived from the filter 31 controls, in the multiplier 32, the amplitude of the displacement signal obtained from filter 28 by varying a multiplier coefficient. Thus, as the temperature rises, the coefficient will be reduced and when the temperature falls the coefficient will be increased. Temperature compensation is useful when the transducer is used as an accelerometer or berometer as it can compensate for changes with temperature of dynamic Youngs Modulus of the materials in the transducer.

Figure 4:
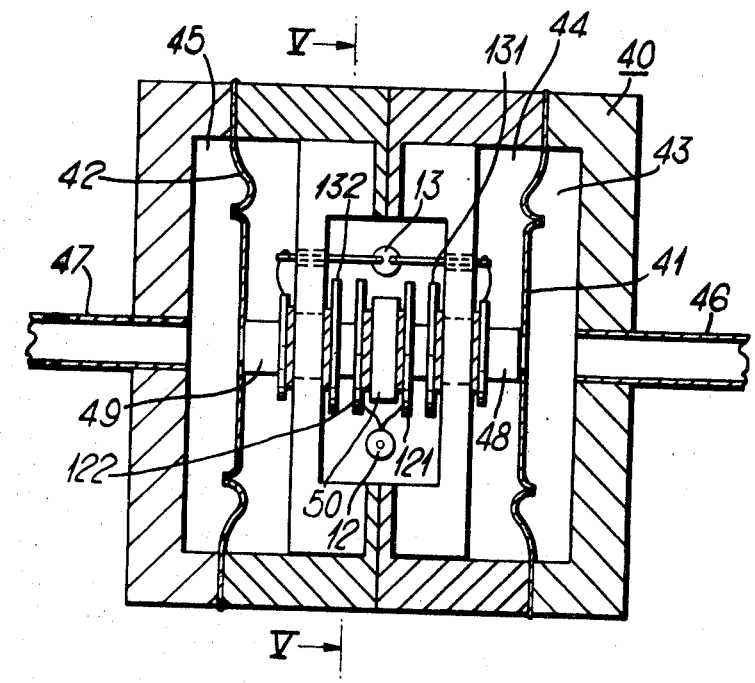
FIG. 4 is a cross-sectional view of a capacitive transducer for measuring pressure according to the invention.
Figure 5:
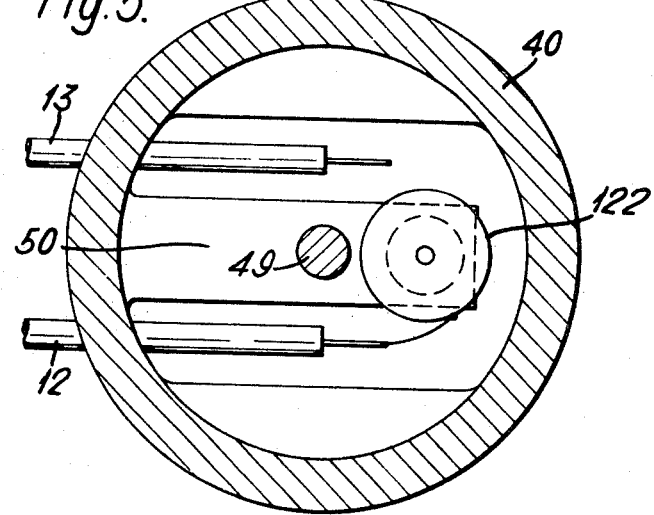
FIG. 5 is a section on the line V—V of FIG. 4.

In FIGS. 4 and 5 the transducer is of a kind suitable for measuring differential pressure. It comprises a pressure casing 40 in four parts which can, for high temperature and pressure use, be edge welded together. Within the casing 40 there are two diaphragms 41, 42 dividing the casing into three chambers 43, 44 and 45. Differential pressure pipes 46, 47 are connected respectively to chamber 43 and 45. The center chamber is vented either to atmosphere, or to any convenient pressure near to the pressures in pipes 46, 47. The flexibility of the diaphragms is confined principally to their edge regions, the center regions being robust and equipped with push rods 48, 49 which bear against a cantilever beam 50. The beam carries two linked capacity plates 121, 122 insulated from the beam. Plates 131, 132 are placed 0.020 inches away from plates 121 and 122 and are physically connected to the transducer body but insulated from it. A twin mineral insulated coble 13 connects the plates 131, 132 to charge amplifiers (as in FIG. 3) and a thermocouple cable 12 supplies the oscillator carrier signal to the plates 121, 122.

Operation follows from that known for differential pressure transducers, namely, the beam 50 deflects according to the differential pressures in chambers 43 and 45 due to action by the push rods moving with deflection of diaphragms 41, 42. The movement of beam 50 increases the capacitance between plates 122 and 132 and decreases that between plates 121 and 131, or vice versa, depending on the direction of deflection of the beam. These two capacitances are connected in a four-arm bridge as in FIG. 3, and the beam deflection determined accordingly as a measure of the differential pressure. It will be seen that, unlike FIGS. 1 and 2, the transducer of FIGS. 4 and 5 does not use changes in leakage capacitance.

In an alternative, non-preferred, form of differential pressure transducer, changes of leakage capacitance between pairs of relatively fixed members are measured, as in FIGS. 1 and 2. In this alter-native transducer the beam 50 is omitted and the diaphragms 41, 42 replaced by bellows of longer travel whose "free" ends control leakage capacitances as they move, in the same manner as does the movement of object 10 relative to the pairs of plates in FIG. 1a. However, long-travel bellows produce a less robust construction and introduce a dependency on bellows characteristics. By contrast, the diaphragms 41, 42 in FIGS. 3 and 4 are principally pressure boundaries with a very small deflection and have a low spring rate compared with beam 50.

Apparatus according to the present invention, comprising a transducer which includes a cantilever beam as in FIGS. 4 and 5, can be used as an accelerometer. The diaphragms and push rods are omitted in this case and the free end of the beam made suitably massive.

The invention allows long lengths (typically 30 meters) of cable 12/13 to be used, as noise unavoidably generated in these cables and picked up externally is 'cancelled out', and the lead/earth capacitance of these cables — which may be as high as 4,000 pF — is of no relevance. The filter 26 greatly assists in the elimination of 'environmental' noise.

With larger plates 121, 122, 131, 132 it would be possible to detect movements of humans passing between the plates and, in this respect, the invention could provide a burglar alarm. As the invention is based on capacitance measurement it could also detect dielectric displacements such as would occur when an air dielectric of one humidity was displaced by a dielectric of changed humidity.

I claim:

1. Measuring apparatus comprising a capacitive transducer comprising members providing a first capacitor and a second capacitor, the capacitance of at least one of said capacitors being variable in accordance with the magnitude of a physical quantity being measured; a four arm bridge; means for connecting said capacitor as two arms of said four arm bridge; two charge amplifiers; means for connecting said charge amplifiers so that said amplifiers and the inputs thereto form the other two arms of said four arm bridge; means for applying an A.C. carrier waveform across the junction of said capacitors and the junction of the inputs of said amplifiers; means for deriving a differential output signal from the outputs of said charge amplifiers; and means for demodulating said differential output signal to produce an output representative of the magnitude of said physical quantity.

2. Apparatus as claimed in claim 1 wherein said transducer which comprises the capacitor arms of said bridge is remotely located relative to the charge amplifiers and said means for applying said carrier waveform, said apparatus further comprising ground-sheathed cables for establishing connections between said transducer on the one hand and said charge amplifiers and said means for applying said carrier waveform on the other hand.

3. Apparatus as claimed in claim 1 wherein said means for applying said carrier waveform includes a thermocouple cable, said apparatus further comprising a thermocouple for registering the temperature at said transducer and generating an e.m.f. in accordance therewith, a temperature compensating multiplier, connected to accept said output representative of the magnitude of said physical quantity, for modifying said output to compensate for the effects of temperature changes at the transducer, and means for utilizing the e.m.f. of said thermocouple to control said temperature compensating multiplier.

4. Apparatus as claimed in claim 1 wherein said members include a first member located between two further members and arranged to be displaced relative to said two further members.

5. Apparatus as claimed in claim 4, wherein the first said member comprises a deflectable cantilever beam and said two further members are rigidly connected to the casing of the transducer.

6. Apparatus as claimed in claim 5, for measuring a pressure differential, wherein the transducer comprises a diaphragm means linked to each side of said cantilever beam by push rod means for deflecting said beam.

* * * * *